United States Patent [19]

Barger et al.

[11] Patent Number: 4,935,838
[45] Date of Patent: Jun. 19, 1990

[54] STRUCTURAL MAGNETIC VIBRATION CONTROLLER AND METHOD FOR ACTIVELY CONTROLLING VIBRATIONS ON STATIONARY COMPONENTS OF ROTARY MACHINERY

[75] Inventors: Joel J. Barger, Stilwell; Philip J. Craig, Olathe, both of Kans.

[73] Assignee: Westinghouse Electric Corp., Pittsburgh, Pa.

[21] Appl. No.: 236,483

[22] Filed: Aug. 25, 1988

[51] Int. Cl.$^5$ ............................................. G05B 1/01
[52] U.S. Cl. .................................... 361/148; 318/114; 318/460; 318/649; 361/147
[58] Field of Search ............... 361/142, 143, 144, 146, 361/147, 148; 318/114, 460, 647, 648, 649

[56] References Cited

U.S. PATENT DOCUMENTS

| | | | |
|---|---|---|---|
| 3,742,862 | 7/1973 | Gebhardt et al. | 361/143 |
| 4,626,754 | 12/1986 | Haberman et al. | 318/460 |
| 4,686,404 | 8/1987 | Nakazeki et al. | 318/629 |
| 4,697,128 | 9/1987 | Matsushit et al. | 318/607 |
| 4,757,980 | 7/1988 | Schubert | 318/649 |
| 4,806,835 | 2/1989 | Haberman | 318/460 |

FOREIGN PATENT DOCUMENTS 59-73341  6/1984  Japan ................................. 318/460

Primary Examiner—M. H. Paschall
Assistant Examiner—Jeffrey A. Gaffin

[57] ABSTRACT

A structural magnetic vibration controller and a method for actively controlling vibrations through the use of a magnetic coupling between a damper mass and a stationary component of rotary machinery wherein the stiffness and damping characteristics of the magnetic coupling are controlled as a function of the relative movements between a first electromagnet carried by the machinery and a second electromagnet carried by the damping mass. The magnetic fields of the magnetic coupling formed by counterpoised electromagnets are controlled by electronic current control circuitry to achieve dynamic tuning via stiffness and dampening characteristics of the magnetic coupling so as to suppress system resonances which occur during transient machinery operation as well as during steady state operation on the basis of a signal from position transducers that provides a displacement feedback that is utilized to vary the coupling stiffness, and a first derivative which is used to control the dampening characteristic of the coupling as a function of the rate at which the position sensed changes with respect to time.

20 Claims, 5 Drawing Sheets

STRUCTURAL MAGNETIC VIBRATION CONTROLLER AND METHOD FOR ACTIVELY CONTROLLING VIBRATIONS ON STATIONARY COMPONENTS OF ROTARY MACHINERY

BACKGROUND OF THE INVENTION

1. Field of the Invention

This invention relates to vibration controllers and methods for reducing of vibrations on stationary components of rotary machinery such as turbines, generators, pumps, motors, fans, and the like. In particular, the invention relates to such controllers and methods which provide an active dynamic controlled damping of vibrations through the use of a magnetic coupling.

2. Description of the Prior Art

For over three quarters of a century, dynamic vibration controllers have been known and used to eliminate resonances which occur in structures when a rotary machine is operated in a steady state condition at a particular rotational frequency. The approaches applied to date for dynamic vibration controllers are mechanical spring-mass damper systems that are tuned so that the natural frequency of the damper is the same as the frequency of the unbalanced force acting on the structure being subjected to vibration control. The dynamic vibration controller generates a force that is equal and opposite to the main system driving force, thereby resulting in a balancing of forces and negligible vibration of the main system. However, the characteristics of the known dynamic vibration controllers are limited in their range of application due to the fact that the spring constants and masses are fixed at the time of design, and while the controllers are tuneable at the time of installation, such as by adjustments to the damper mass, they do not possess the ability to change stiffness and damping characteristics during operation in order to compensate for system resonances during transient machinery operation (such as speed changes).

On the other hand, many machines experience resonance conditions during variable speed operation and some even under steady state conditions. Vibration resonances which occur during transient machinery operations as well as those that occur during steady state operation are undesirable due to the direct effects of the vibrations on the machinery and due to the noise generation associated therewith. Thus, there is a need for an active dynamic vibration controller that will have the ability to provide a controllable damper natural frequency that will allow the damper to compensate for system resonance during transient machinery operation and under various steady state operating conditions, i.e., that can reduce single or multiple vibration resonances.

SUMMARY OF THE INVENTION

In its broadest sense, the invention is a structural magnetic vibration controller and a method for actively controlling vibrations through the use of a magnetic coupling between a damper mass and a stationary component of rotary machinery wherein the stiffness and damping characteristics of the magnetic coupling are controlled as a function of the relative movements between a first electromagnet carried by the machinery and a second electromagnet carried by the damping mass. The controller and method of the invention is particularly applicable to the reduction of vibrations on the stationery components of rotary machinery such as turbines, generators, pumps, motors, fans, and the like because of the fact that vibration resonances which occur during transient machinery operation as well as steady state operation can be compensated for by virtue of the ability, according to the invention, to change stiffness and dampening characteristics while the machinery is in operation, thereby allowing the damper to compensate for one or more system resonances occurring during transient machinery operation (such as speed changes or startup and shutdown) or in one or more steady state operating ranges.

In particular, by the introduction of a magnetic coupling of which the stiffness and dampening characteristics can be dynamically tuned, the natural frequency of the damper can be adjusted during operation so that system resonances can be dampened even during transient operation. This dynamic tuning is achieved, in accordance with preferred embodiments, by forming the magnetic coupling of counterpoised electromagnets, the intensities of the magnetic fields of which are controlled by electronic current control circuitry. The electronic control circuitry utilizes a feedback circuit wherein the signal from position transducers is used to adjust the current supplied to the magnets. That is, displacement feedback is utilized to vary the coupling stiffness while the first derivative of the feedback signal is used to control the dampening characteristic of the coupling.

The invention enables structural vibrations of a machine to be eliminated or substantially reduced without major modifications to the equipment foundation and can be installed even while a machine continues operation. Furthermore, a single physical design can be used for a variety of applications yet still produce a simple and effective control of resonance vibrations and overall noise to a greater extent than standard dynamic vibration absorbers.

In accordance with one preferred embodiment of the invention, the damper mass is magnetically suspended so as to eliminate the transmission of structural vibrations from the damper to the damper housing. However, where there is little concern about forces being transmitted to the foundation, in accordance with another preferred embodiment of the present invention, the magnetic coupling can be applied so as to act directly between the foundation and the stationary components of the machinery. In either case, the electronic control circuitry is utilized to apply direct force compensation to the structure, thereby resulting in balanced forces and, therefore, negligible vibration.

The structural magnetic vibration controllers in accordance with the embodiments of the present invention generally comprise a first electromagnet carried by the machinery whose vibrations are to be controlled, a damper mass carrying a second electromagnet which is positioned in counterpoising relationship to the first electromagnet so as to create a magnetic coupling therebetween, a proximity type position sensor which produces a signal that is proportional to the distance between the electromagnets, a power supply for controlling the magnetic field of the magnetic coupling, and a feedback control connected between the position sensor and the power supply. In accordance with the method, the stiffness and dampening characteristics of the magnetic coupling are adjusted (as a function of the signal produced during sensing of the distance between the first and second electromagnets via the position sensor) through controlling of the power supply for the magnetic coupling.

The feedback control of the controller and which enables the method to be performed automatically, comprises a stiffness gain amplifier, a damping gain amplifier and a summing amplifier. The stiffness gain amplifier produces an output which changes as a function of changes in the distance between the electromagnets that is reflected by the signal produced by the position sensor, while the damping gain amplifier produces an output which changes as a function of changes in the velocity of the first electromagnet relative to the second electromagnet that are reflected by the output signal from the position sensor. A summing amplifier receives the outputs from the stiffness and damping gain amplifiers and produces a control signal based upon the sum of the outputs of these gain amplifiers. The control signal from the summing amplifier is employed for controlling the power supply for the electromagnets. Preferably, a low pass filter is used to reduce high frequency noise in the signal delivered from the position sensor to the gain amplifiers, and the control signal from the summing amplifier is passed through a lead network and/or other minor loop compensation networks for stability prior to being applied to the control electronics of the power supply.

In an application of the invention to a generator of the type that is found in a typical power plant, particular advantages can be achieved. For example, in some generators, the generator frame has been found to be resonant at the operating speed of the generator shaft. Changing the mass of the frame or its stiffness sufficiently to change the natural frequency of the frame is very difficult and expensive, while the use of conventional dynamic vibration absorbers to change the frame natural frequency not only requires that the dynamic vibration absorbers be custom tuned for each application, but should the resonant frequency of the frame change with time, the dynamic vibration absorber must be changed as well. Furthermore, unless complicated dynamic vibration absorber arrangements are used, only one frequency can be detuned. In contrast, a structural magnetic vibration controller in accordance with the present invention and implementation of the inventive method can be carried out without even having to suspend operation of the generators. This may be achieved by attaching a bracing frame arm to the resonant structure, for example, at the bearing brackets of the generator shaft, the first electromagnet being positioned on this arm. A damper housing containing the damper mass and the second electromagnet may then be positioned adjacent to the first electromagnet to create the magnetic coupling. Proximeter probes carried by the damping mass and bracing frame arm are then able to sense the position of the opposed electromagnets and produce the necessary electronic feedback control, the power supply for the magnets and the electronic controls being locatable elsewhere in the power plant in a clean environment, such as a control room.

DETAILED DESCRIPTION OF THE PREFERRED EMBODIMENTS

Figure 1:
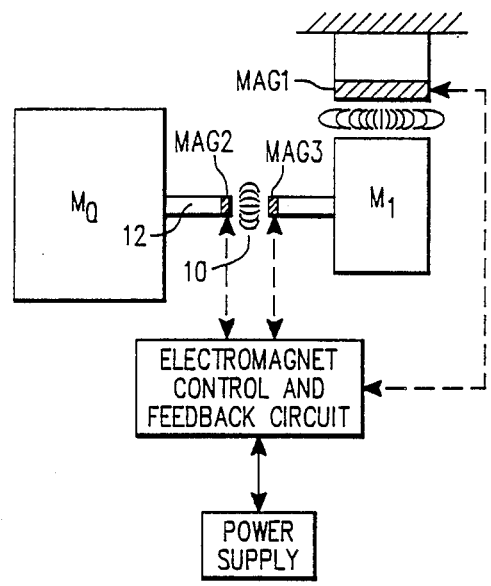
FIG. 1 is a diagrammatic depiction of a structural magnetic vibration controller in accordance with a first embodiment of the invention.
Figure 2:
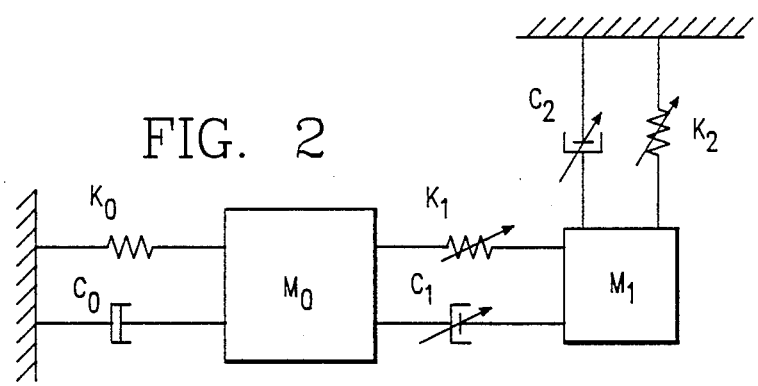
FIG. 2 schematically depicts the characteristics of the FIG. 1 embodiment controller in terms of an equivalent system of springs and dampening components.

With reference to FIGS. 1 and 2, a first form of structural magnetic vibration controller will be described. For purposes of controlling undesirable structural vibration of a rotary machine, such as a generator, turbine, pump, motor, fan, or the like, or of an overall structure equipped with such rotary machinery, for example, a submarine hull, depicted generally as a system mass $M_0$, a damper mass $M_1$ is selected to provide the proper force range required for steady state vibration control at the maximum machinery forcing frequency with a solid damper bar. This damper mass $M_1$ is suspended and stabilized (levitated) by an electromagnet MAG1, the mass $M_1$ being provided with a target surface of magnetic material which may be attracted by the magnetic field effects of the magnet MAG1. Preferably, this target surface will be a cooled, laminated surface of the mass $M_1$. While such suspension of the damper mass $M_1$ is not essential, it is advantageous because it reduces the transmission of structural vibrations from the damper mass to its damper housing, thereby reducing the transmission of forces to the foundation upon which it is supported, and because it provides no forces or resistance to horizontal motion, thereby simplying the equations of motion.

In order to enable the damper mass $M_1$ to counterbalance the vibrations of system mass $M_0$, a magnetic coupling 10 is created therebetween by a pair of electromagnets MAG2, MAG3 that are positioned in counterpoising relationship to each other. The magnet MAG2 is carried by a stationary component of the system mass $M_0$. such as by a frame bracing arm 12, while the MAG3 is carried by the damper mass $M_1$. An electromagnet control and feedback circuit is used to vary the magnitude of current supplied to the electromagnets, and the rate of change thereof, in order to vary the stiffness and dampening characteristics of the magnetic coupling 10, as will be described in greater detail below For purpose of determining the relationships of mass ratios, damper natural frequency, damper displacement, and other important relationships, concerning both the mechanical and electrical design of a structural magnetic vibration controller in accordance with present invention, the system can be evaluated on the basis of its equivalent spring and damping component system. The equivalent system schematic for the FIG. 1 embodiment is depicted in FIG. 2. In this case, since the magnetic suspension system provides no forces or resistance to horizontal motion, the equation of motion for mass $M_0$ can be described as:

$$M_0(d^2X_0/dt^2) + K_0X_0 + K_1(X_1-X_0) + C_0(dX_0/dt) + C_1[(dX_0/dt)-(dX_1/dt)] = P_0 \sin Wt.$$

Furthermore, the governing equation for mass $M_1$ can be described as:

$$M_1(d^2X_1/dt^2) + C_1[(dX_1/dt)-(dX_0/dt)] + K_1(X_1-X_0) = 0.$$

In the case of both of these equations, the governing parameters are:

$M_0$ = main system mass
$M_1$ = damper mass
$X_0$ = displacement of $M_0$
$X_1$ = displacement of $M_1$
$K_0$ = spring constant of $M_0$ relative to foundation
$K_1$ = variable spring constant of magnetic coupling
$C_0$ = dampening constant of $M_0$ relative to foundation
$C_1$ = variable dampening constant of magnetic coupling
$P_0$ = applied force
$w$ = angular velocity
$t$ = elapsed time Solution of these differential equations will yield the relationships necessary to design a specific system for a given application using existing technology and commercially available components. An example of a suitable control system developed in accordance with the present invention will be described further on.

Figure 3:
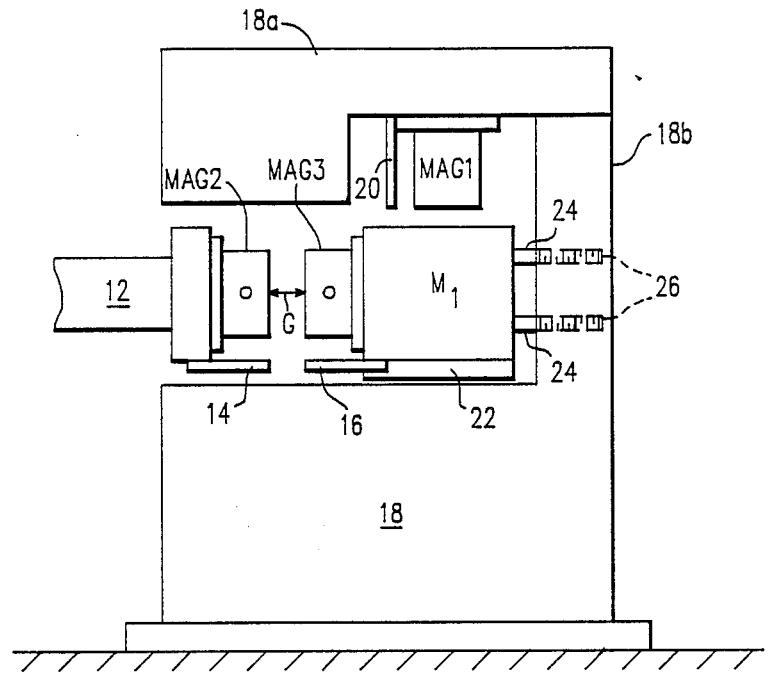
FIG. 3 is a side elevational view of a structural magnetic vibration controller in accordance with the FIG. 1 embodiment of the present invention.

An example of a structural magnetic vibration controller in accordance with the FIG. 1 embodiment is illustrated in FIG. 3. In this example, arm 12 (which is attached directly to the resonant structure) is shown, not only carrying the electromagnet MAG2, but also a proximeter probe 14 which coacts with a proximeter probe 16 which, like the electromagnet MAG3, is carried by the damper mass $M_1$. While a relatively large gap G is shown between the two electromagnets MAG2 and MAG3, this gap, in practice, is on the order 20-30 mils.

To support and guide the damper mass $M_1$, the controller is provided with a base 18 that provides physical support for the structure and also serves as an enclosure that further reduces the noise generated. The magnet MAG1 is mounted to the underside of an overhang 18a of the controller base 18 and serves for a magnetically suspending the mass $M_1$ at a height that is maintained constant via a proximeter probe 20 that locates the position of the damper mass relative to the suspension electromagnet MAG1. However, this magnetic suspension can be supplemented by the provision of a backup linear bearing arrangement 22 for supporting of the damper mass $M_1$ or, in a simpler modified arrangement, the damper mass could be supported on a vibration isolation pad or only the linear bearing arrangement 22. Additionally, FIG. 3 shows the damper mass $M_1$ being guided by guide arms 24 which extend through slide bearings 26 that are disposed within the upright 18b of the base 18.

The suspended damper mass arrangement of the control shown in FIG. 3 is advantageous because in this arrangement there is no mechanical wear involved. Furthermore, the enclosing nature of the base 18 facilitates noise reduction and, in fact, the base can be constructed as an airtight enclosure for the damper mass $M_1$ within which the damper mass is able to operate in a vacuum, thereby contributing to still greater noise reductions.

Figure 4:
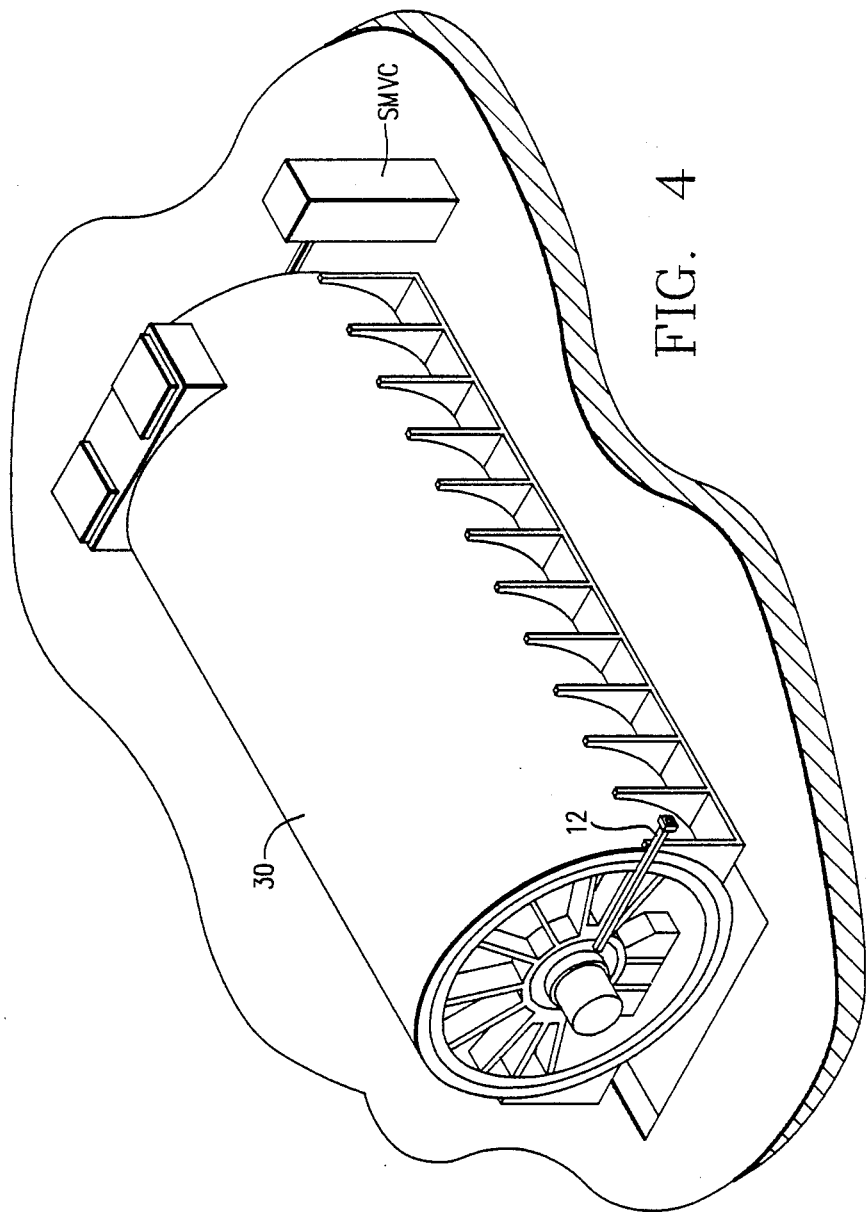
FIG. 4 is a perspective view showing implementation of the invention with respect to a generator of the type found in a typical power plant.

FIG. 4 shows use of a structural magnetic vibration controller in accordance with the present invention for a generator 30 of a type that is found in a typical power plant. Because the forcing function for a resonant generator frame is the unbalanced vibration forces of the shaft, the optimal position for placing a structural magnetic vibration controller SMVC is at each of the bearing brackets for the shaft. In FIG. 4, the full SMVC is shown at the right, while only the frame bracing arm 12 of the SMVC, carrying MAG2, is shown at the left end of the generator 30. In such an arrangement, the power supply for the magnets and the electronic controls may be located elsewhere in the plant in a clean environment, such as with the generator monitoring controls in the power plant control room. The SMVC may be of the magnetically suspended damper mass type shown in FIG. 3, or may be of the simpler construction referred to above, and diagrammatically depicted in FIG. 5, wherein the damper suspending electromagnet is eliminated and a damper mass in the form of a fixed magnetic coupling support structure 51 is provided for an electromagnet MAG2 that forms the magnetic coupling 10 with the electromagnet MAG1 of the resonant structure $M_o$.

The feedback control means for controlling the magnetic coupling 10 will now be described generally with reference to FIG. 6 and with greater detail with respect to FIG. 7. The system illustrated in FIG. 6 employs a single position sensor in a feedback loop for controlling the magnetic field of the magnetic coupling 10 formed by the opposed, oppositely wound electromagnets $M_1$, $M_2$ via a single power amplifier connected to both. However, the illustrated system may employ a dual sensor arrangement wherein each magnet is individually controlled by its own sensor and control feedback loop. In either event, the system would contain the same basic components which will now be described.

Figure 6:
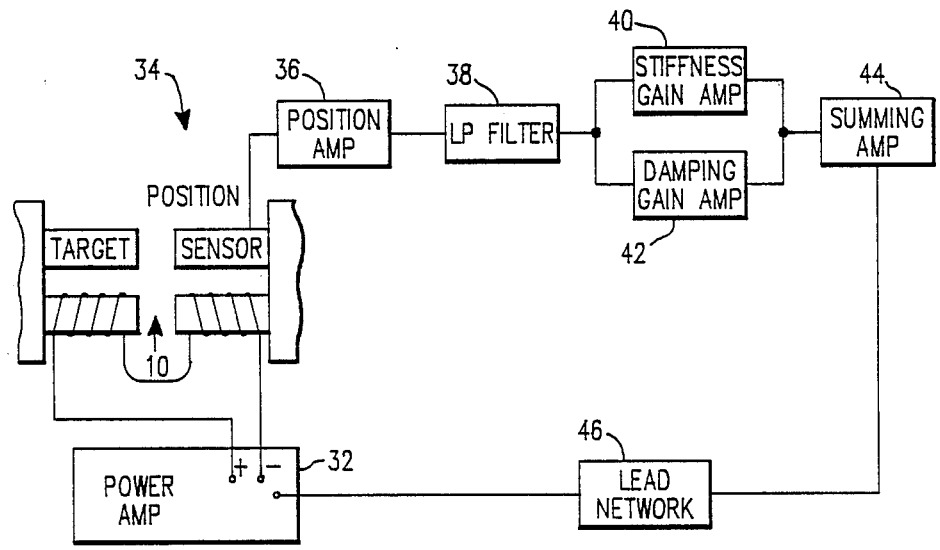
FIG. 6 is a block diagram depicting a current control system for use in accordance with the present invention.

In the system as represented in FIG. 6, the position sensor, for example single proximeter sensor, produces a signal that is proportional to the distance between the masses $M_0$, $M_1$, the DC component of the signal having been nulled to zero for a predetermined static position of the mass $M_1$. The signal from the position sensor is amplified and a low pass filter used to reduce high frequency noise. After passing through the low pass filter 38, the signal from the position sensor is then split and provided to a stiffness gain amplifier 40 and a damping gain amplifier 42. The stiffness gain amplifier is used to control the stiffness of the magnetic coupling by producing an output which changes as a function of changes in the distance between the electromagnets $M_1$, $M_2$. The damping gain amplifier 42 produces an output which changes as a function of changes in the relative velocity of the first electromagnet $M_1$ relative to the second electromagnet $M_2$ that are reflected by the signal from the position sensor. Since velocity is the first derivative of distance, this result can be obtained by constructing the damping gain amplifier as a differentiating amplifier. The two outputs of the gain amplifiers 40, 42 are recombined in a linear gain summing amplifier 44 for producing a control signal based upon the sum of the outputs of the stiffness gain amplifier 40 and the damping gain amplifier 42. For stability purposes, the control signal from the summing amplifier 44 should be supplied to the power amplifier 36 via a lead network and/or other minor loop compensation network. It is noted that the power amplifier utilized as the power supply for the electromagnets is of conventional design, and other current generators may be utilized for the electromagnets, as well.

Figure 7:
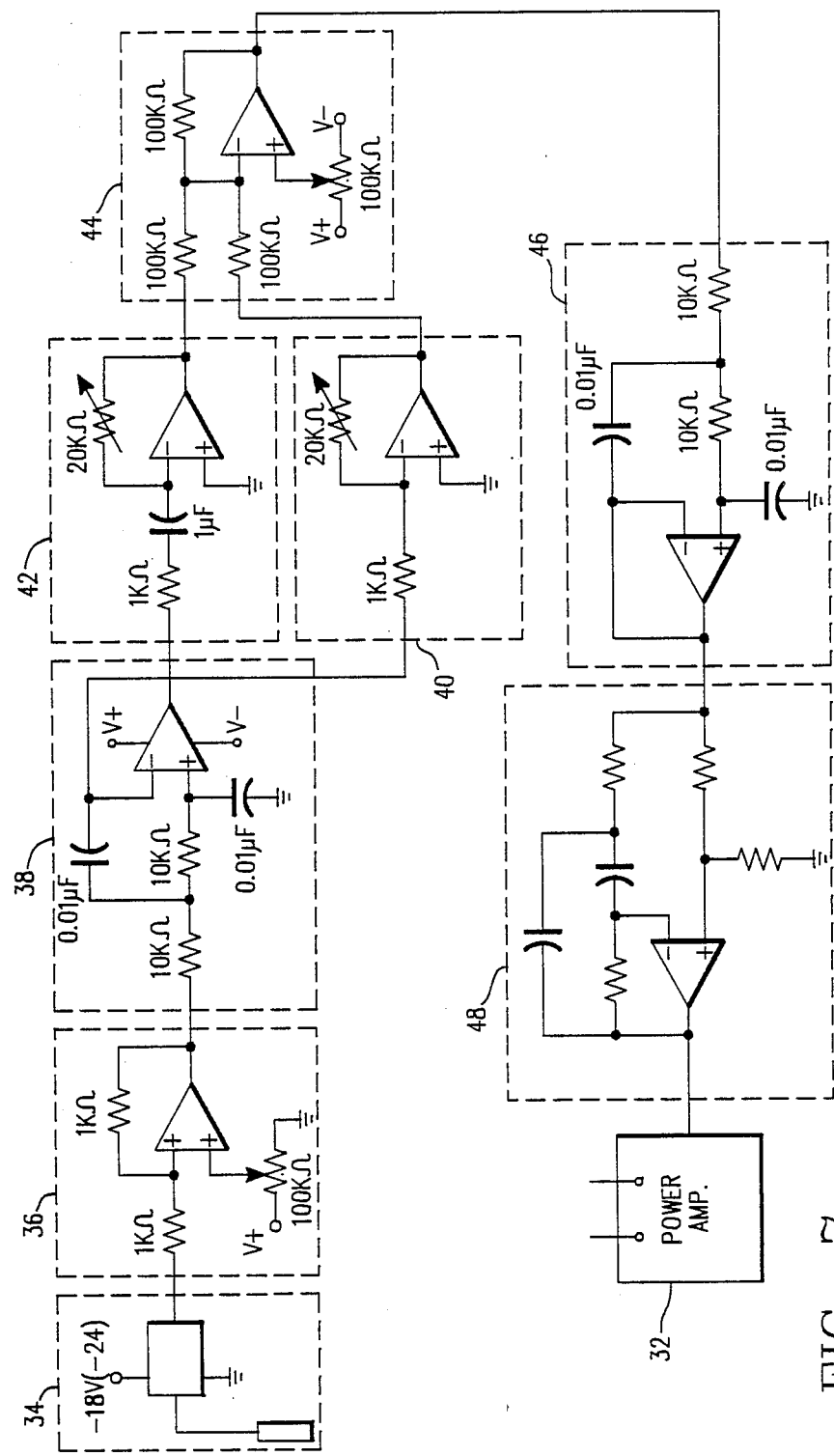
FIG. 7 is a circuit diagram depicting an example of a control circuit for use in accordance with the invention.

While the exact components of the control system, just described, will be system dependent and may be constructed of any number of different types of conventional circuit components, FIG. 7 illustrates an example of one circuit that has been found suitable for controlling of the magnet coupling 10. In accordance with this circuit, a proximeter with an eddy current probe and driver is utilized as a position sensor 34, which produces a position signal that is amplified in a position amplifier 36. Position amplifier 36 also serves to null the DC component of the position signal to zero for a predetermined static position of the mass $M_1$ so as to prevent saturation of the operational amplifiers used in the illustrated circuit. The position signal is processed further by a low pass filter network 38 which serves to reduce high frequency noise. After the position signal is processed by the low pass filter 38, it is split and delivered to the stiffness gain amplifier 40 and to the damping gain amplifier 42.

Both of the amplifiers 40, 42 are operational amplifiers of a variable gain type so that, via either analog or digital controllers, the gain values of these amplifiers can be changed in correspondence with different operating ranges, thereby enabling the vibration controller to be programmed electronically to reduce multiple resonances associated with different operating ranges and/or transient conditions. The gain values to be used for a particular system may be determined either empirically or mathematically. Furthermore, it is noted that the operational amplifier of which the damping gain amplifier is comprised is a differentiating amplifier. Thus while the stiffness gain amplifier is a linear gain amplifier which processes the position signal and produces an output that is a function of displacement, the damping gain amplifier processes the position signal logarithmically and produces an output that is a function of velocity, i.e., the rate at which the position sensed changes with respect to time.

The outputs from the gain amplifiers 40, 42 are combined in a linear gain summing amplifier 44 in order to produce a control signal that is reflective of the need to compensate for both the magnitude and frequency of the vibration effects experienced by the resonant mass $M_0$. Before applying the control signal from the summing amplifier 44 to the power amplifier 32, the signal is compensated, by a second low pass filter 46 and by a lead network 48 that is linear but changes phase with changes in frequency, for stability. The compensated signal is then delivered to the power amplifier in order to effectuate a controlled adjustment in the current supplied to the electromagnets which will produce stiffness and damping characteristics in the magnetic coupling 10 so as to modify the natural frequency of the damper in a manner which will enable the system resonances to be dampened. In this regard, it is noted that not only can the current magnitude be adjusted, cut also its polarity and the rate of change thereof, since the vibrations will be at a constant or changing frequency that seeks to move the magnets toward and away from each other in a cyclical manner so that the field of the counterpoising magnets of the magnetic coupling 10 can, therefore, cyclically reverse their attractive and repulsive modes, as well as vary the strength thereof, in keeping with the frequency and magnitude of the vibrations of the mass $M_0$ to be controlled. Because electromagnets produce relatively weak repulsive forces compared to attractive forces, mot designs will employ a varying current to the magnets to cycle the magnitude of attractive forces only.

As represented in the drawings and described herein, the damper mass $M_1$ is described as being suspended or levitated by means of only a single magnet, as opposed to the pair of magnets used for vibration control. This is because of the fact that much larger forces and distances are associated with the vibration control than the damper mass suspension. However, despite this difference, electronically, no significant changes in the above-described control system are required for control of the suspension magnet MAG1 of FIGS. 1 and 3. That is, a control circuit as illustrated in FIG. 7 may be utilized simply by effectuating an adjustment in the gain factors used for the various operational amplifiers.

Figure 8:
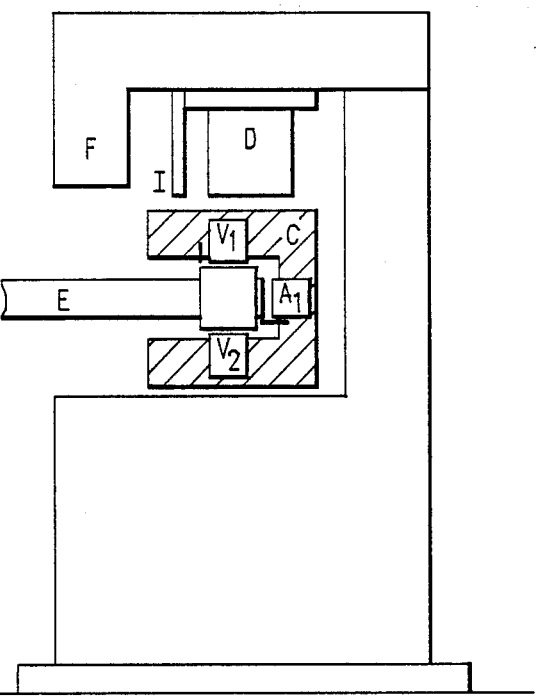
FIG. 8 is a partial sectional view of a tridirectional magnetic vibration controller.
Figure 9:
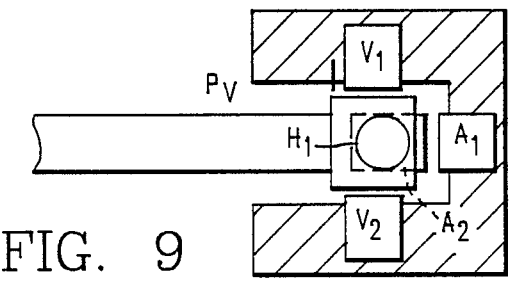
FIGS. 9 and 10 are, respectively, side and top sectional views illustrating the magnet arrangement of the FIG. 7 controller.
Figure 10:
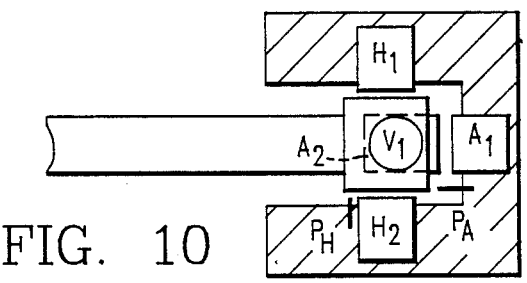

The embodiments of the invention described so far are designed for dampening vibration along a single axis. Such controllers and the method of vibration control described with reference thereto, are versatile and will have a wide field of application. However, in some instances, it may be necessary to provide triaxial vibration control. With reference to FIGS. 8-10, it now will be described how the concepts and structure already explained may be applied to the production of a triaxial vibration controller which may effectively dampen vibrations occurring in vertical, horizontal and axial directions. It is also noted that, to the extent that the embodiment of FIGS. 8-10 share components in common with those of the preceding embodiments, the same reference numerals are utilized for simplicity, merely being distinguished by a prime (') designation.

Figure 5:
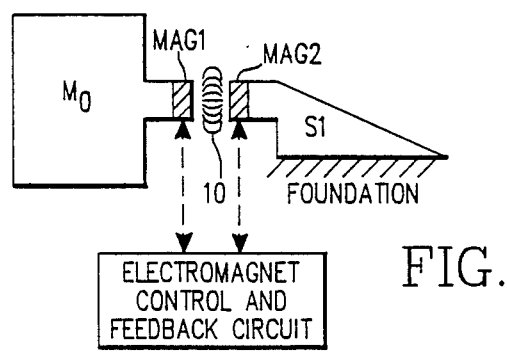
FIG. 5 is a diagrammatic illustration of a modified embodiment of the present invention.

With reference to FIG. 8, it can be seen that the triaxial structural magnetic vibration controller depicted therein is similar to that illustrated in FIG. 3 in that to support and guide the damper mass $M'_1$, the controller is provided with a base 18' having an overhang 18'a that serves for magnetically suspending the mass $M'_1$ via a magnet MAG1' at a height that is maintained constant via a proximeter probe 20'; although, mass $M'_1$ could be bolted to a solid foundation or structure for vibration control similar to the one directional controller depicted in FIG. 5. However, to obtain triaxial vibration dampening, instead of providing the arm 12' (which is attached to the resonant structure) with a single magnet which cooperates with a single magnet carried by the damper mass, five sets of control magnets are utilized. That is, as can be seen in conjunction with FIGS. 9 and 10, mass $M'_1$ is provided with a pair of vertical axis control magnets $V_1$, $V_2$ which form magnetic couplings in conjunction with vertical axis control magnets $V_1$, $V_2$, mounted within the target end portion of arm 12', while horizontal axis control is obtained via horizontal axis control magnets $H_1$, $H_2$ of the mass $M'_1$ and arm 12', and axial axis control is obtained via axial axis control magnets $A_1$, $A_2$ of the mass $M'_1$ and arm 12' in a like manner.

For vibration control, the distance between the magnets of the respective pairs of magnets is sensed by a proximeter probe $P_V$ relative the target portion 12't of the arm 12', and by a proximeter probe $P_H$ and $P_A$ that also senses distance relative to the target portion 12't. The signals produced by the position sensing means $P_B$, $P_H$ and $P_a$ are proportional to the distance between the respective magnet pairs $V_1$, $V_2$; $H_1$, $H_2$; and $A_1$, $A_2$, and are utilized to damp vertical, horizontal and axial vibrations, respectively, by controlling of the magnetic couplings formed by the magnet pairs, using essentially the same electronics, for each, as shown and described relative to FIGS. 6 and 7, above. Electronically, the only differences in the control scheme will be the gain factors used for the operational amplifiers, reflective of the varying magnitudes of forces to be suppressed in the vertical, horizontal and axial directions.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

What is claimed is:

1. Structural magnetic vibration controller for actively controlling vibrations on stationary components of rotary machinery during transient as well as steady state operating conditions, said controller comprising:
   (A) a first electromagnet carried by a stationary component of said machinery;
   (B) a damper mass;
   (C) a second electromagnet carried by said damper mass and positioned in counterpoising relationship to said first electromagnet in a manner creating a magnetic coupling therebetween;
   (D) position sensing means for producing a feedback signal proportional to the distance between said first and second electromagnets;
   (E) power supply means for controlling said magnetic coupling; and
   (F) feedback control means, connected between said position sensing means and said power supply means, for adjusting stiffness and damping characteristics of said magnetic coupling as a function of the feedback signal produced by said position sensing means by controlling of said power supply means.

2. Controller according to claim 1, wherein said feedback control means comprises a stiffness gain amplifier, a damping gain amplifier and a summing amplifier; wherein said stiffness gain amplifier produces an output which changes as a function of changes in the distance between said electromagnets reflected by the feedback signal produced by said position sensing means; wherein said damping gain amplifier produces an output which changes as a function of changes in the velocity of the first electromagnet relative to said second electromagnet reflected by said feedback signal; and wherein said summing amplifier produces a control signal based upon the sum of the outputs of said gain amplifiers.

3. Controller according to claim 2, wherein a low pass filter means is provided between said position sensing means and said gain amplifiers.

4. Controller according to claim 3, wherein a compensation circuit is provided between said summing amplifier and said power supply means for stabilizing the control signal.

5. Controller according to claim 2, wherein a compensation circuit is provided between said summing amplifier and said power supply means for stabilizing the control signal.

6. Controller according to claim 1, wherein said first electromagnet is mounted to a frame bracing arm that is attached to a bearing member of the machinery.

7. Controller according to claim 6, wherein said second electromagnet is magnetically suspended from a base member of the controller.

8. Structural magnetic vibration control system for actively controlling vibrations on stationary components of rotary machinery during transient as well as steady state operating conditions, said system having a plurality of controllers connected to said machinery, each said controller comprising:
   (A) a first electromagnet carried by a stationary component of said machinery;
   (B) a damper mass;
   (C) a second electromagnet carried by said damper mass and positioned in counterpoising relationship to said first electromagnet in a manner creating a magnetic coupling therebetween;
   (D) position sensing means for producing a feedback signal proportional to the distance between said first and second electromagnets;
   (E) power supply means for controlling said magnetic coupling; and
   (F) feedback control means, connected between said position sensing means and said power supply means, for adjusting stiffness and damping characteristics of said magnetic coupling as a function of the feedback signal produced by said position sensing means by controlling of said power supply means.

9. Control system according to claim 8, wherein said first electromagnet of each controller is mounted to a frame bracing arm that is attached to a bearing member of the machinery.

10. Control system according to claim 9, wherein said second electromagnet of each controller is magnetically suspended from a base member of the controller.

11. Control system according to claim 10, wherein said machinery is a power plant generator and said bracing member is connected to a bearing bracket of a rotor shaft of the generator.

12. Method of actively controlling vibrations on stationary components of rotary machinery during transient as well as steady state operating conditions comprising the steps of:
   (A) providing a first electromagnet carried by a stationary component of said machinery;
   (B) providing a damper mass carrying a second electromagnet;
   (C) positioning said second electromagnet in counterpoising relationship to said first electromagnet in a manner creating a magnetic coupling therebetween;
   (D) sensing the distance between said first and second electromagnets and producing a signal proportional thereto; and
   (E) adjusting stiffness and damping characteristics of said magnetic coupling as a function of the signal produced during said sensing step by controlling of a power supply controlling said magnetic coupling.

13. Method according to claim 12, wherein said adjusting step is performed as a function of a control signal produced based upon the sum of the output of a linear gain amplifier that produces a stiffness output that changes as a function of changes in the distance between the first and second electromagnets and the output of a differentiating amplifier which produces a damping output that changes as a function of changes in the velocity of the first and second electromagnets.

14. Method according to claim 13, wherein said first electromagnet is mounted to a frame bracing arm that is attached to a bearing arm of the machinery.

15. Method according to claim 14, wherein machinery is a power plant generator and said steps are performed at each of a pair of bearing brackets of a rotor shaft of the generator.

16. Method according to claim 13, wherein said damper mass is magnetically suspended during performance of steps C–E.

17. Method according to claim 13, wherein said first and second electromagnets are axially oriented relative to a frame bracing are carrying said first electromagnet and are controlled for suppressing vibration in an axial direction; and wherein further sets of first and second electromagnets are provided oriented in respective horizontal and vertical directions, said further sets being controlled for suppressing vibration in said horizontal and vertical directions.

18. Structural magnetic vibration controller for actively controlling vibrations on stationary components of rotary machinery during transient as well as steady state operating conditions, said controller comprising:
(A) a first electromagnet carried by a stationary component of said machinery;
(B) a damper mass;
(C) a second electromagnet carried by said damper mass and positioned in counterpoising relationship to said first electromagnet in a manner creating a magnetic coupling therebetween;
(D) power supply means for controlling said magnetic coupling; and
(E) feedback control means for adjusting stiffness and damping characteristics of said magnetic coupling, said feedback control means comprising sensing means position dependent variable, means for producing feedback signals from said output signal that are respectively proportional to the distance and velocity of said first electromagnet relative to said second electromagnet; and means for controlling said power supply means as a function of said feedback signals.

19. Method of actively controlling vibrations on stationary components of rotary machinery during transient as well as steady state operating conditions comprising the steps of:
(A) providing a first electromagnet carried by a stationary component of said machinery;
(B) providing a damper mass carrying a second electromagnet;
(C) positioning said second electromagnet in counterpoising relationship to said first electromagnet in a manner creating a magnetic coupling therebetween;
(D) sensing a position dependent variable and producing an output signal that is proportional thereto;
(E) processing said output signal and producing feedback signals therefrom that are respectively proportional to the distance and velocity of said first electromagnet relative to said second electromagnet; and
(F) adjusting stiffness and damping characteristics of said magnetic coupling as a function of the feedback signals produced from said output signal during said processing step by controlling of a power supply controlling said magnetic coupling.

20. Method according to claim 19, wherein the step of producing feedback signals comprises producing the feedback signal that is proportional to the relative velocity of the electromagnets by differentiating said output signal.

* * * * *